United States Patent
Mühlmann et al.

(10) Patent No.: US 12,024,185 B2
(45) Date of Patent: Jul. 2, 2024

(54) METHOD AND SYSTEM FOR SYNCHRONIZING AT LEAST TWO SENSOR SYSTEMS

(71) Applicants: Robert Bosch GmbH, Stuttgart (DE); Daimler AG, Stuttgart (DE)

(72) Inventors: Karsten Mühlmann, Stuttgart (DE); Christoph Keller, Stuttgart (DE); Christian Maier, Wernau (DE)

(73) Assignees: Robert Bosch GmbH, Stuttgart (DE); Daimler AG, Stuttgart (DE)

( * ) Notice: Subject to any disclaimer, the term of this patent is extended or adjusted under 35 U.S.C. 154(b) by 161 days.

(21) Appl. No.: 17/079,604

(22) Filed: Oct. 26, 2020

(65) Prior Publication Data
US 2021/0146940 A1 May 20, 2021

(30) Foreign Application Priority Data
Oct. 25, 2019 (DE) ..................... 10 2019 216 517.6

(51) Int. Cl.
*B60W 50/06* (2006.01)
*B60W 30/14* (2006.01)
(Continued)

(52) U.S. Cl.
CPC ............ *B60W 50/06* (2013.01); *B60W 30/14* (2013.01); *B60W 50/0205* (2013.01);
(Continued)

(58) Field of Classification Search
CPC .. B60W 50/06; B60W 30/14; B60W 50/0205; B60W 50/14; B60W 60/0011;
(Continued)

(56) References Cited

U.S. PATENT DOCUMENTS 9,537,956 B1 * 1/2017 Sibenac ............... H04W 56/001
9,596,666 B1 * 3/2017 Sibenac ................. H04W 4/70
(Continued)

FOREIGN PATENT DOCUMENTS

| DE | 10 2015 212 218 | 1/2017 | |
|---|---|---|---|
| DE | 10 2018 203 117 | 9/2019 | |
| WO | WO-2017070593 A2 * | 4/2017 | ............... G06F 1/12 |

OTHER PUBLICATIONS

Office Action for German Patent Application No. 10 2019 216 517.6 dated Aug. 11, 2020.
(Continued)

*Primary Examiner* — Mohamed Abdo Algehaim
(74) *Attorney, Agent, or Firm* — HUNTON ANDREWS KURTH LLP

(57) ABSTRACT

Exemplary method, system, device and computer-accessible medium can be provided for synchronizing a plurality of sensor systems with respect to a respective phase for providing data. For example, each of the sensor systems can periodically provide the data. This can be done by, e.g., (i) generating a phase request from at least one processing unit for each of the plurality of sensor systems, whereas the processing unit(s) can be configured to receive the data from the plurality of sensor systems, (ii) analysing all phase requests to ascertain executeability thereof, (iii) generating target phase requests if the phase requests have been determined and/or confirmed as being executable, and (iv) transmitting the respective target phase requests to the respective sensor systems for synchronizing the phases of the plurality of the different sensor systems.

18 Claims, 1 Drawing Sheet

(51) Int. Cl.
*B60W 50/02* (2012.01)
*B60W 50/14* (2020.01)
*B60W 60/00* (2020.01)
*H04L 67/12* (2022.01)

(52) U.S. Cl.
CPC ........ *B60W 50/14* (2013.01); *B60W 60/0011* (2020.02); *B60W 60/0015* (2020.02); *B60W 60/007* (2020.02); *H04L 67/12* (2013.01); *B60W 2420/403* (2013.01); *B60W 2420/408* (2024.01); *B60W 2420/54* (2013.01)

(58) Field of Classification Search
CPC .......... B60W 60/0015; B60W 60/007; B60W 2420/42; B60W 2420/52; B60W 2420/54; B60W 10/00–2900/00; H04L 67/12; H04L 67/00–67/75; G01D 21/00–21/02; B60R 11/00–11/06; H04N 5/04
USPC ........................................................ 701/23
See application file for complete search history.

(56) References Cited

U.S. PATENT DOCUMENTS

| | | | | |
|---|---|---|---|---|
| 10,063,369 | B1* | 8/2018 | Murphy | A61B 5/7225 |
| 10,334,331 | B2* | 6/2019 | Al-Stouhi | G07C 5/008 |
| 2001/0005406 | A1* | 6/2001 | Mege | H04L 27/2003 |
| | | | | 375/354 |
| 2005/0021201 | A1* | 1/2005 | Klotz | B60W 30/16 |
| | | | | 702/189 |
| 2005/0252709 | A1* | 11/2005 | Steiger | G01D 3/08 |
| | | | | 280/801.1 |
| 2006/0220725 | A1* | 10/2006 | Cohen | H04L 25/03267 |
| | | | | 327/524 |
| 2010/0076617 | A1* | 3/2010 | Van Den Keybus | G05B 19/042 |
| | | | | 700/297 |
| 2010/0085238 | A1* | 4/2010 | Muller-Frahm | G01S 13/867 |
| | | | | 342/70 |
| 2010/0097192 | A1* | 4/2010 | Weston | B60C 23/0442 |
| | | | | 340/10.3 |
| 2012/0163520 | A1* | 6/2012 | Liu | G01D 21/00 |
| | | | | 375/356 |
| 2013/0018620 | A1* | 1/2013 | Riendeau | G01D 21/00 |
| | | | | 702/89 |
| 2015/0112545 | A1* | 4/2015 | Binion | G07C 5/12 |
| | | | | 701/1 |
| 2017/0041688 | A1* | 2/2017 | Pitigoi-Aron | H04J 3/0685 |
| 2017/0168494 | A1* | 6/2017 | Sibenac | B60W 30/08 |
| 2017/0269601 | A1* | 9/2017 | Jones | G01S 19/13 |
| 2017/0270014 | A1* | 9/2017 | Poledna | B60W 50/00 |
| 2018/0088584 | A1* | 3/2018 | Tascione | G05D 1/0276 |
| 2018/0089538 | A1* | 3/2018 | Graham | G01S 13/931 |
| 2018/0176424 | A1* | 6/2018 | Christl | H04N 7/181 |
| 2019/0049958 | A1* | 2/2019 | Liu | G01S 17/00 |
| 2019/0069051 | A1* | 2/2019 | Al-Stouhi | G07C 5/008 |
| 2020/0070847 | A1* | 3/2020 | Horiguchi | G06N 5/04 |
| 2020/0104611 | A1* | 4/2020 | Ross | G06K 9/6289 |
| 2020/0180653 | A1* | 6/2020 | Chi | B60W 60/00182 |
| 2020/0207362 | A1* | 7/2020 | Nishida | B60W 50/032 |
| 2020/0303211 | A1* | 9/2020 | Scheutz | G06N 20/00 |
| 2021/0053580 | A1* | 2/2021 | Horiguchi | B60W 50/0097 |
| 2021/0362706 | A1* | 11/2021 | Horiguchi | B60W 50/0097 |
| 2021/0383133 | A1* | 12/2021 | Wang | G01S 15/931 |

OTHER PUBLICATIONS

Second Chinese Office Action dated Feb. 15, 2023 for Chinese Patent Application No. 202011146758.8.

* cited by examiner

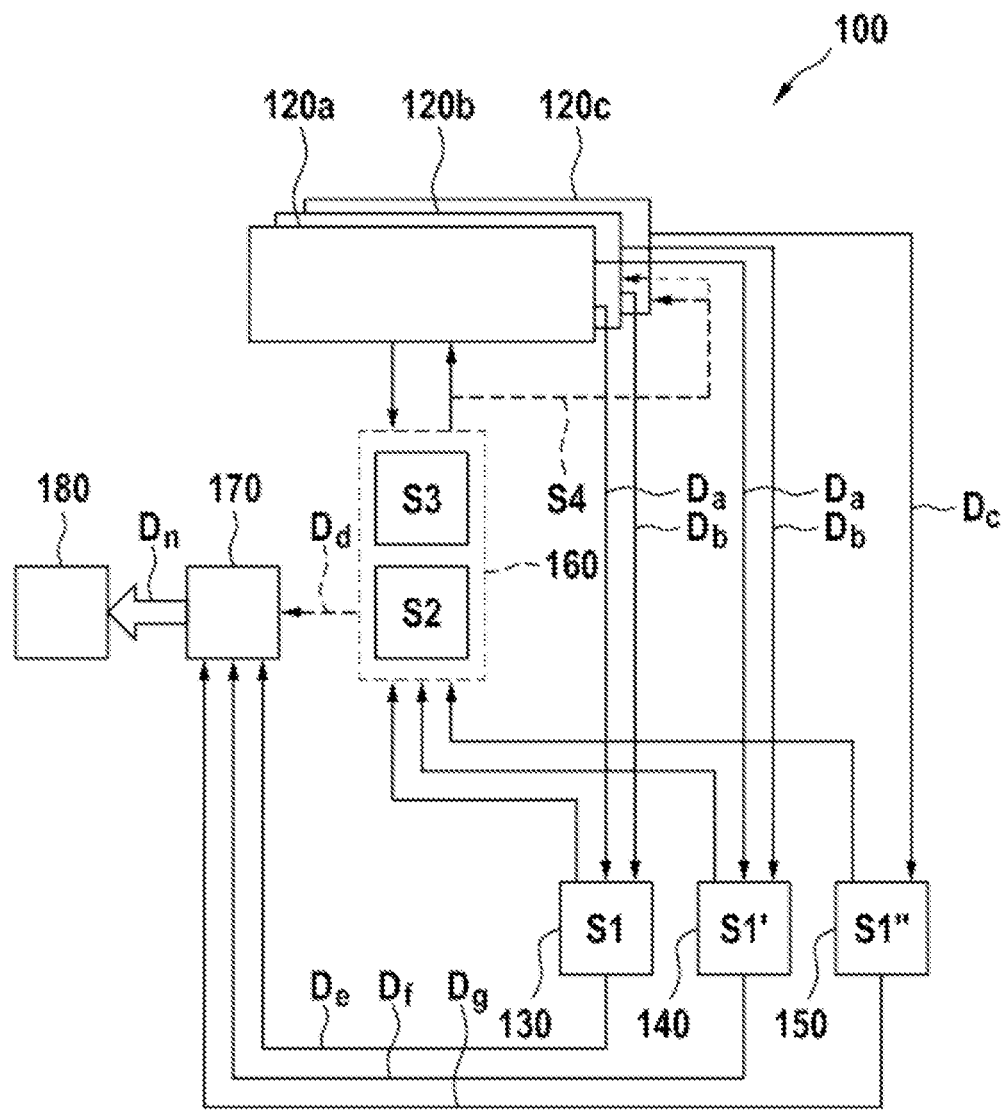

METHOD AND SYSTEM FOR SYNCHRONIZING AT LEAST TWO SENSOR SYSTEMS

CROSS-REFERENCE TO RELATED APPLICATION(S)

This application claims the benefit and priority to German Patent Application No. 10 2019 216 517.6 filed on Oct. 25, 2019, the entire disclosure of which is incorporated herein by reference.

FIELD OF THE DISCLOSURE

The present disclosure relates to method and system for synchronizing a plurality of sensor systems with regard to a respective phase for providing data, whereas each of the sensor systems can provide data periodically.

BACKGROUND INFORMATION

For an at least partially automated mobile platform, data from several sensor modalities, even different ones, such as digital camera data, RADAR data, LIDAR data or ultra-sound data are required for the most comprehensive and reliable detection of the environment. Thus, a certain robustness against inadequacies or malfunctions of individual sensor modalities may be achieved. For a sensor data fusion, it may be advantageous to be able to match the data of the different sensor modalities in respect to time. Due to their design, different sensor modalities have different sampling rates and a data acquisition time may not be freely chosen for many of the sensor modalities.

In the sensor systems typically used for at least partially automated mobile platforms, the different sensor modalities are either not synchronized at all, as for example in an emergency brake system comprising a RADAR and video system, or a fixed synchronization is configured, such as between four cameras of an all-around camera system for parking.

SUMMARY OF EXEMPLARY EMBODIMENTS

A fixed synchronization between the points in time for the provision of data from different sensor systems, for example, for a sensor-data fusion or sensor-online calibration, would create difficult-to-fulfil requirements for the communication between the systems, and due to this coupling, the failure of one system may have system-wide failure effects with regard to the provision of data.

According to exemplary embodiments of the present disclosure, a method for synchronizing a plurality of sensor systems, a method for control, a device, a computer program, and a machine-readable storage medium can be provided, which at least partially solves the tasks described above.

The exemplary embodiments of the present disclosure are provided based on the insight that for a plurality of sensor systems installed in modern vehicles, a synchronization of the plurality of sensor systems is possible by iteratively shifting the time of a periodic data provision.

As provided herein, the sequence of procedural steps is merely exemplary, and presented in such a way that the process is easily comprehensible, without the sequence being required or in any way limiting. The skilled person would certainly recognize, however, that many of the process procedures and/or steps can also be executed in a different order and lead to the same, similar or a corresponding result. In this sense, the sequence of the process steps may be changed or otherwise modified accordingly.

According to an exemplary embodiment of the present disclosure, a method can be provided for synchronizing a plurality of sensor systems with regard to a respective phase is proposed for a provision of data, whereby the sensor systems can provide the data periodically.

In one exemplary procedure and/or step, a phase request is generated by at least one processing unit for each of the plurality of sensor systems, whereby the at least one processing unit is configured to receive the data of the plurality of sensor systems. In a further step, all phase requests are examined for executeability. In a further exemplary procedure and/or step, target phase requests can be generated, if the phase requests were examined as executable. In yet further exemplary procedure and/or step, the respective target phase requests can be transmitted to the respective sensor systems to synchronize the phases of the plurality of the different sensor systems.

In this exemplary context, a "phase" can mean a phase angle or time offset between periodically provided data from a sensor system and a periodic clock signal provided within or outside the sensor system.

A "phase request" for a sensor system can mean a request for the sensor system to provide its data in a specific phase relationship and/or time relationship to the data provided by the other sensor systems and/or a provided clock signal. For example, the target phase request for a sensor system may be to provide its data simultaneously, i.e. in phase, or not simultaneously, i.e. out of phase, with the data provided by another sensor system.

A "target phase request" of a sensor system can mean the target value of a phase and/or a time offset with which this sensor system is to provide its data.

Examples for different exemplary sensor systems or sensor modalities can include digital camera systems, RADAR systems, LIDAR systems or ultrasonic systems. The plurality of sensor systems may contain the same types of sensor systems as well as different sensor systems.

The exemplary synchronization of at least a part of the plurality of sensor systems may be configured in such a way that, for example, identical sensor systems provide their data alternately, thus ensuring that the sensor systems do not influence each other during operation. For example, the simultaneous activity of two RADAR systems in an overlapping spatial area is at least unfavorable for RADAR systems.

Furthermore, such exemplary synchronization of identical sensor systems in the sense of an offset interval may be useful for the function in order to enable a higher effective sampling rate or data density of the sensor systems combined in this way.

If the respective periodic provision of data of a first sensor system is a multiple of the second sensor system, the synchronization can be directed to this multiple.

Exemplary sensor systems having an identical interval for the provision of their data may provide these data at the same time for a simple sensor data fusion according to such exemplary method for synchronizing the provision of the data. This can mean that the sensor systems would be active simultaneously.

In this context, a point in time of data provision is understood to be a point in time of data acquisition.

The provision of data from sensor systems that are synchronized with the described method for synchronizing are robust against a failure of individual sensor systems, because in this form of synchronization none of the sensor systems is waiting for a provision of data from another sensor system.

A plurality of exemplary sensor systems may comprise a small number of sensor systems, e.g., two or three sensor systems, the plurality may also comprise 100 sensor systems or a much higher number of sensor systems can be synchronized with this exemplary method.

According to an exemplary embodiment of the procedure of the present disclosure, at least one of the plurality of different sensor systems can be configured to provide data according to the respective target phase requests until new target phase requests are transmitted to the sensor system. This can ensures that sensor systems synchronized with such exemplary method for synchronizing are robust against a failure of a central synchronization system, because the sensor systems may continue to provide their data to the corresponding processing unit according to a given clock signal.

According to one aspect of the exemplary method, at least one of the plurality of the different sensor systems can be configured to provide the data according to the target phase requests in case of failure of an external clock signal, to which the phase for providing data refers. This may be achieved, for example, by the sensor systems having an internal clock system that ensures, at least for a certain time, that a certain synchronicity of the provided data of the plurality of the sensor systems is guaranteed. This increases the safety of an at least partially automated platform in case of a failure of sensor systems, for example to put the at least partially automated platform into a safe cruise condition within a certain time.

According to an exemplary embodiment of the present disclosure, procedural steps for examining most or all phase requests for executeability can be provided. In one exemplary procedure and/or step, each of the plurality of phase requests for each sensor system can be compared with a specification of the respective sensor system. In a further procedure and/or step, most or all phase requests can be compared with stored phase request scenarios for different cruise conditions. The plurality of the phase requests can be determined as executable in a further step, if the phase requests of at least one of the two comparisons are fulfilled.

For different cruise conditions, phase request scenarios can be be created or optimized offline, such that the comparison with the phase requests of at least one processing unit may be designed as a simple comparison.

Such exemplary method for synchronizing a plurality of sensor systems facilitates a possible addition of further sensor systems to the plurality of sensor systems without having to examine compatibility with the other sensor systems individually. A further instruction of a processing unit or an additional processing unit may also be easily integrated. Furthermore, by examining the phase requests, the overall exemplary system including the majority of sensor systems and processing units can be more reliable with regard to new configurations.

According to an exemplary embodiment of the present disclosure, if at least one of the plurality of phase requests has been examined as not executable, either a plurality of target phase requests based on the plurality of phase requests can be generated by optimization and examined for executability, and/or a first error signal can be sent to an error manager if the examination for executability of the target phase requests generated by optimization has been examined and/or determined as being not executable.

Such exemplary can be is based on a number of individual optimization targets, which may be stored for each of the used sensor types and each combination of the used sensor types for an optimization.

For an exemplary definition of single optimization targets, on the one hand, mutually beneficial or undesired interactions of different sensors or different sensor types may be determined and stored accordingly as a respective single optimization target according to the sensors or sensor types.

On the other hand, sensor fusion scenarios or sensor type fusion scenarios, e.g., to maximize information acquisition, may be determined for the corresponding combination of sensor types or sensors and stored accordingly to define single optimization goals.

One exemplary goal of such an optimization can then be to achieve as many individual optimization goals as possible without contradictions.

Such individual optimization targets may refer to a measurement frequency or a field of view of individual sensor types. With regard to a combination of different sensor types or a number of identical sensor types, such single optimization goal may refer to a synchronization of measuring points of different sensors or different sensor types.

In other words, e.g., the exemplary aim is to optimize that as many such requirements or individual optimization goals as possible are met. A trigger plan manager, for example, should additionally examine and ensure that these individual optimization goals can be met. An optimum would be achieved if all individual optimization goals may be fulfilled simultaneously by adjusting target phase requests accordingly.

Examples of such exemplary individual requirements or individual optimization goals are listed below, which are not limiting:

Two radar sensors should not transmit simultaneously into the same field of view, because then the basic assumption (per radar sensor) "Measured Signal=Function of: (Transmitted Signal, Scene)" is violated because two different sensors transmit into the scene and cannot be separated. Therefore, all radar sensors should measure individually in their overlapping areas of the respective field of view.

One video sensor and one lidar sensor each should (if possible) measure simultaneously in their overlap areas, because then the movement of the objects may be neglected and e.g. classification results from the video image may be used for the point cloud, or the 3D coordinates from the point cloud may be related to the objects detected in the image.

A "Field-of-View" should not be measured with all sensors at the same time, if this would result in a too long sequence for the next measurement, but the plurality of sensors should increase the measuring frequency in the area. Smaller time intervals for a recording of moving objects measured at different times increase the possibility of association for identification and thus stable tracking. If, for example, positions of objects of a two-way traffic have changed significantly between two measurements, tracking of individual objects is difficult and error-prone.

This may also facilitate new requirements or preferences of at least one processing unit to be taken into account and, since their executeability is examined, they may also be safely integrated. If the executeability of the specific phase requests is not fulfilled, an error signal may be output.

According to an exemplary embodiment of the present disclosure, offline calculated phase request scenarios can be used for the generation of target phase requests by optimization based on the plurality of phase requests.

For the different cruise conditions of such an at least partially automated mobile platform, such as a freeway trip or a parking process, different phase requests scenarios may be created or generated offline, for example, so that the phase requests may be easily and quickly examined by the processing unit and transferred to the respective sensor systems as target phase requests.

According to an exemplary embodiment of the present disclosure, at least one processing unit can be configured to examine whether each of the phase requests of the processing unit is fulfilled by the corresponding sensor system.

For this exemplary purpose, the majority of the sensor systems provide a timestamp of the recording of the data of the respective sensor system with the provision of the respective data, such that the processing unit can examine the requested synchronization of the majority of the sensor systems before the data is further analyzed and/or merged.

According to an exemplary embodiment of the present disclosure, the processing unit(s) can transmit a second error signal and/or a fulfilment status of the phase request to an error manager if at least one of the phase requests is not fulfilled.

Using such exemplary embodiment of the procedure, it can be ensured that a quality of the necessary data, for example with regard to their presence and synchronicity, which are necessary for a safe cruise condition of the at least partly automated platform, is always achieved. By transmitting the fulfilment status, the error manager can receive a more detailed information about possible partial functionalities.

According to an exemplary embodiment of the present disclosure, the error manager can transmit possible driving modes to a vehicle control system depending on the first and/or second error signal and/or the degree of fulfilment of the phase requests transmitted by the at least one processing unit.

This can increase and/or maximize the availability of the system, which can be primarily important in the case of an error, so that the system may still automatically reach a safe state.

According to an exemplary embodiment of the present disclosure, the processing unit(s) can be or include a sensor data fusion system and/or a sensor data calibration system.

According to an exemplary embodiment of the present disclosure, at least one of the plurality of the sensor systems can be configured to adapt the respective phase for the provision of data to the respective target phase request by a stepwise change of the respective phase and to actively control the respective phase according to the respective target phase request.

Many sensor systems may not be configured to generate or provide data at any time, but may make small changes with regard to the time of generation or provision of data. This gives the possibility to shift iteratively, for example before the at least partially automated mobile platform is actively used, and thus to set a certain phase to a central carrier signal and to maintain this phase with an active control.

According to an exemplary embodiment of the present disclosure, based on the first and/or the second error signal, a control signal can be provided to control an at least partially automated vehicle; and/or based on the first and/or the second error signal a warning signal is provided to warn a vehicle occupant.

The term "based on" can be be broadly understood with respect to the feature that a control signal based on the first and/or second error signal is provided. Such exemplary term can be understood in the context that a first and/or a second error signal is used for any determination or calculation of a control signal, but this does not exclude that other input variables are also used for this determination of the control signal.

Such exemplary control signal may be provided for this purpose, for example, by controlling an at least partially automated vehicle:

to limit the speed of the at least partially automated vehicle;

no longer provide certain automated driving modes of the vehicle, such as lane change or city driving; and/or assume a safe operating condition, such as stopping at the edge of the road or making an emergency stop.

This may further increase the safety of an overall system consisting of a number of sensor systems and processing units.

According to an exemplary embodiment of the present disclosure, a device/system can be provided which is configured to perform one of the above-described exemplary procedures. With such exemplary device, the corresponding procedure may be easily integrated into different systems.

According to an exemplary embodiment of the present disclosure, a computer program can be provided that includes instructions that, when executed by a computer, cause it to perform one of the exemplary procedures described above. Such exemplary computer program can facilitate the use of the described procedure in different systems.

A machine-readable storage medium can also be provided, according to exemplary embodiments of the present disclosure, specified on which the exemplary computer program described above can be stored.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying FIGURES showing illustrative embodiments of the present disclosure, in which:

The FIGURE depicts an exemplary system of sensor systems and processing units and an exemplary method for synchronizing a plurality of sensor systems, according to the exemplary embodiment of the present disclosure.

Throughout the drawings, the same reference numerals and characters, unless otherwise stated, are used to denote like features, elements, components, or portions of the illustrated embodiments. The views in the drawings are merely schematic and are not to scale. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

The FIGURE shows a combined systems and method diagram in which a method 100 is provided for synchronizing a plurality of sensor systems 120a, 120b, 120c with respect to a respective phase for providing data is sketched. Each of the sensor systems 120a, 120b, 120c can periodically provide the data to the at least one processing unit 130, 140, 150 via the signal couplings Da, Db, Dc.

The FIGURE further illustrates the signal coupling Dc between a sensor system 120c and an evaluation component 150, and that an evaluation component 150 can be configured in such a way that only a subset of the plurality of sensor systems 120a, 120b, 120c provides the data.

For example, in a step S1, S1', S1" of the FIGURE, phase requests are generated by at least one or a plurality of processing units 130, 140, 150 for each of the plurality of sensor systems 120a, 120b, 120c, whereas the at least one processing unit 130, 140, 150 can be configured to receive the data via signal couplings Da, Db, Dc between the plurality of sensor systems 120a, 120b, 120c and at least one processing unit 130, 140, 150 of the plurality of sensor systems 120a, 120b, 120c.

In a further step S2, all phase requests can be examined for executeability. In yet another step S3, target phase requests can be generated, provided that the phase requests have been examined as executable. A Trigger Plan Manager 160 may be configured to execute process steps S2 and S3.

In a further step S4, the respective target phase requests can be transmitted to the respective sensor systems to synchronize the phases of the plurality of the different sensor systems 120a, 120b, 120c.

If in step S2, at least one of the plurality of the phase requests is examined and/or determined as not being executable, a first error signal may be transmitted from the Trigger Plan Manager 160 via a signal coupling Dd to an Error Manager 170.

A second error signal may be transferred from the at least one processing unit 130, 140, 150 via signal couplings De, Df, Dg to error manager 170 if at least one of the plurality of phase requests is not fulfilled.

The error manager 170 may be configured to send the first and/or second error signal via a signal coupling Dn to a vehicle control 180 of the at least partially automated vehicle.

It should be noted that exemplary embodiments of the present disclosure are described with reference to different subject matters. In particular, some embodiments are described with reference to method type claims whereas other exemplary embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. All features can be combined providing synergetic effects that are more than the simple summation of the features.

While the exemplary embodiments of the present disclosure have been illustrated and described in detail in the drawings and foregoing description, such illustrations and descriptions are to be considered illustrative or exemplary and not restrictive. The present disclosure is not limited to the disclosed embodiments. Other variations to the disclosed exemplary embodiments can be understood and effected by those skilled in the art in practicing the present disclosure provided herein, from a review of the drawings, the disclosure, and the claims.

In the claims, the word "comprising" does not exclude other elements or steps, and the indefinite article "a" or "an" does not exclude a plurality. A single computer processor or other unit may fulfil the functions of several items re-cited in the claims. The mere fact that certain measures are re-cited in mutually different dependent claims does not indicate that a combination of these measures cannot be used to advantage.

What is claimed is:

1. A method for synchronizing a plurality of sensor systems for providing data with respect to a respective phase, the method comprising:
    generating a phase request by at least one processing device for each of the plurality of sensor systems, wherein the at least one processing device is configured to receive the data from the plurality of sensor systems;
    analyzing all phase requests so as to ascertain executability thereof, wherein the analyzing comprises:
    (a) comparing each of the phase requests for each of the plurality of sensor systems with a specification of such respective one of the plurality of sensor systems,
    (b) comparing all the phase requests with stored phase request scenarios for different cruise conditions, and
    (c) determining that the phase requests are executable if the phase requests satisfy at least one of the comparison (a) or comparison (b);
    generating target phase requests if the phase requests have been confirmed as executable, wherein a request of the target phase requests for:
    a first sensor system of the plurality of sensor systems provides first data thereof in phase, and
    a second sensor system of the plurality of sensor systems provides second data thereof out of phase with the first data; and
    transmitting the respective target phase requests to the respective sensor systems so as to synchronize phases of different sensors of the plurality of patent sensor systems, wherein each of the plurality of sensor systems periodically provides the data.

2. The method according to claim 1, wherein at least one of the different sensors of the plurality of sensor systems is configured to provide the data according to the respective target phase requests until new target phase requests are transmitted to the at least one of the different sensors of the plurality of sensor system.

3. The method according to claim 1, wherein at least one of the different sensors of the plurality of sensor systems is arranged, in an event of a failure of an external trigger signal to which the respective phase for providing data references, to provide the data according to the target phase requests.

4. The method according to claim 1, wherein, when at least one of the phase requests has been analysed as being not executable, performing one of (a) generating the target phase requests by optimization and analysing the target phase request for executability based on the plurality of phase requests, or (b) transmitting a first error signal to an error manager when the analysis of executability of the target phase requests generated by the optimization has been analyzed as being not executable.

5. The method according to claim 4, further comprising utilizing off-line calculated phase request scenarios for the generation of the target phase requests by the optimization based on the phase requests.

6. The method according to claim 4, wherein the error manager transmits feasible driving modes to a vehicle controller based on at least one of the first error signal or a degree of fulfilment of the phase requests transmitted by the at least one processing device.

7. The method according to one of claim 4, further comprising, based on the first error signal, performing at least one of:
provide a control signal for controlling an at least partially automated vehicle; or
providing a warning signal for warning a vehicle occupant.

8. The method according to claim 1, wherein the at least one processing device examines whether each of the phase requests of the at least one processing device is fulfilled by a corresponding one of the plurality of sensor systems.

9. The method according to claim 1, wherein the at least one processing device transmits at least one of a second error signal or a fulfilment status of the phase requests to an error manager if at least one of the phase requests unfulfilled.

10. The method according to claim 9, wherein the error manager transmits feasible driving modes to a vehicle controller based on at least one of the second error signal or a degree of fulfilment of the phase requests transmitted by the at least one processing device.

11. The method according to one of claim 9, further comprising, based on the second error signal, performing at least one of:
providing a control signal for controlling an at least partially automated vehicle; or
providing a warning signal for warning a vehicle occupant.

12. The method according to claim 1, wherein the at least one processing device is at least one of a sensor data fusion system or a sensor data calibration system.

13. The method according to claim 1, wherein at least one of the plurality of sensor systems is configured, by stepwise changing the respective phase, to adapt the respective phase for providing the data to the respective target phase request, and to actively controls the respective phase according to the respective target phase request.

14. The method according to claim 1, wherein the target phase request for the first sensor system of the plurality of sensor systems provides the first data in phase and the second sensor system of the plurality of sensor systems provides the second data in at least one of a specific phase relationship or a specific time relationship not simultaneously with the data provided by the first sensor system.

15. An apparatus for synchronizing a plurality of sensor systems for providing data with respect to a respective phase, the apparatus comprising:
at least one controller configured to:
generate a phase request by at least one processing device for each of the plurality of sensor systems, wherein the at least one processing device is configured to receive the data from the plurality of sensor systems;
analyze all phase requests so as to ascertain executability thereof, wherein the analysis comprises:
(a) comparing each of the phase requests for each of the plurality of sensor systems with a specification of such respective one of the plurality of sensor systems,
(b) comparing all the phase requests with stored phase request scenarios for different cruise conditions, and
(c) determining that the phase requests are executable if the phase requests satisfy at least one of the comparison (a) or comparison (b);
generate target phase requests if the phase requests have been confirmed as executable, wherein a request of the target phase requests for:
a first sensor system of the plurality of sensor systems provides first data thereof in phase, and
a second sensor system of the plurality of sensor systems provides second data thereof out of phase with the first data; and
transmit the respective target phase requests to the respective sensor systems so as to synchronize phases of different sensors of the plurality of sensor systems, wherein each of the plurality of sensor systems periodically provides the data.

16. The apparatus according to claim 15, wherein the target phase request for the first sensor system of the plurality of sensor systems provides the first data in phase and the second sensor system of the plurality of sensor systems provides the second data in at least one of a specific phase relationship or a specific time relationship not simultaneously with the data provided by the first sensor system.

17. A non-transitory computer-accessible storage medium storing a computer program thereon for synchronizing a plurality of sensor systems for providing data with respect to a respective phase, wherein when executed on a computer processing configuration, the computer software configures the computer processor configuration to execute procedures comprising:
generating a phase request by at least one processing device for each of the plurality of sensor systems, wherein the at least one processing device is configured to receive the data from the plurality of sensor systems;
analyzing all phase requests so as to ascertain executability thereof, wherein the analyzing comprises:
(a) comparing each of the phase requests for each of the plurality of sensor systems with a specification of such respective one of the plurality of sensor systems,
(b) comparing all the phase requests with stored phase request scenarios for different cruise conditions, and
(c) determining that the phase requests are executable if the phase requests satisfy at least one of the comparison (a) or comparison (b);
generating target phase requests if the phase requests have been confirmed as executable, wherein a request of the target phase requests for:
a first sensor system of the plurality of sensor systems provides first data thereof in phase, and
a second sensor system of the plurality of sensor systems provides second data thereof out of phase with the first data; and
transmitting the respective target phase requests to the respective sensor systems so as to synchronize phases of different sensors of the plurality of sensor systems, wherein each of the plurality of sensor systems periodically provides the data.

18. The computer-accessible storage medium according to claim 17, wherein the target phase request for the first sensor system of the plurality of sensor systems provides the first data in phase and the second sensor system of the plurality of sensor systems provides the second data in at least one of a specific phase relationship or a specific time relationship not simultaneously with the data provided by the first sensor system.

* * * * *